United States Patent [19]

Hwang

[11] Patent Number: 5,788,407
[45] Date of Patent: Aug. 4, 1998

[54] PAVING METHOD OF WATER-PERMEABLE CONCRETE

[76] Inventor: Ik Hyun Hwang, 131-10, Songpa-Dong, Songpa-Ku, Seoul, Rep. of Korea

[21] Appl. No.: 640,230

[22] Filed: Apr. 30, 1996

[30]     Foreign Application Priority Data

May 1, 1995 [KR] Rep. of Korea ............ 95-10663
Aug. 1, 1995 [KR] Rep. of Korea ............ 95-24082

[51] Int. Cl.$^6$ ........................................ E01C 7/14
[52] U.S. Cl. ......................... 404/81; 404/82; 404/31
[58] Field of Search ..................... 404/82, 81, 17, 404/27, 31, 71, 72, 75, 70; 524/5, 8; 428/703

[56]         References Cited

U.S. PATENT DOCUMENTS

| | | | |
|---|---|---|---|
| 984,801 | 2/1911 | Davis | 404/81 |
| 2,083,900 | 6/1937 | Ebberts et al. | 404/31 |
| 3,850,537 | 11/1974 | Bynum, Jr. | 404/17 |
| 3,870,422 | 3/1975 | Medico, Jr. | 404/27 |
| 3,887,506 | 6/1975 | Hewitt | 260/17 A |
| 4,107,112 | 8/1978 | Latta, Jr. et al. | 260/18 EP |
| 4,362,586 | 12/1982 | Uffner et al. | 404/82 |
| 4,398,842 | 8/1983 | Hodson | 404/2 |
| 4,826,350 | 5/1989 | Kambe | 404/27 |
| 4,834,577 | 5/1989 | Perfetti | 404/82 |
| 4,895,476 | 1/1990 | Vangaever | 404/6 |

FOREIGN PATENT DOCUMENTS

| | | | |
|---|---|---|---|
| 6180002 | 6/1994 | Japan | 404/17 |
| 280251 | 11/1927 | United Kingdom | 404/82 |

*Primary Examiner*—James Lisehora
*Attorney, Agent, or Firm*—Banner & Witcoff, Ltd.

[57]          ABSTRACT

Described is a paving method of fine water-permeable concrete which can be used for roadways, sidewalks, bikeways, parking lots, public squares, etc. A base layer of water-permeable concrete is paved by spreading and pounding a sand filter layer and a rubble base layer on the consolidated ground to have porosity after pounding of 10–20% and a coefficient of water permeability of more than $10 \times 10^{-2}$ cm/sec. A mixture of crushed waste glass, fine rubble, 250–500 kg/m$^3$ of cement, water at a water-cement ratio of 25–40%, and a polymer in an amount of 10–50% of the weight of cement used based on 50% solid material is spread on the base layer and pounded. The concrete is aged for more than one day, a mixture of a polymer and water was sprayed on the base layer to be absorbed, after which aging is done to complete the construction.

5 Claims, 8 Drawing Sheets

PAVING METHOD OF WATER-PERMEABLE CONCRETE

BACKGROUND OF THE INVENTION

1. Field of the Invention

The present invention relates to a paving method of water-permeable concrete, particularly to a paving method of concrete which can be used for expressways, highways, roadways, sidewalks, bikeways, parking lots, public squares, etc. The method aims at obtaining smooth road surfaces to which various colors and patterns can be applied, as well as obtaining high-strength concrete with minimum surface porosity by employing a coloring construction method to reduce production cost.

2. Description of the Prior Art

Water-permeable pavement in a broad sense is classified into two categories: one is water-draining pavement which lets water such as rain water flow into the pavement itself through small spaces formed between the particles of the pavement material; another is water-permeable pavement in a narrow sense which lets water such as rain water flow into the ground through a filter layer under the water-draining pavement. (Hereinafter, water-permeable pavement refers to that in a narrow sense.) Such water-permeable pavement is effective for the protection of ecological system in nature, the protection of underground water, the prevention of hydroplanning, the reduction of noise due to friction between wheels and road surfaces, the prevention of diffused reflection due to dampness of road surfaces, the prevention of flooding of city watercourses, the prevention of weakening of the ground due to outflow of underground water, the prevention of reverse flow of sea water, etc.

Water-permeable pavement materials include colored concrete described in Korean Patent No. 36,315 (registered Sep. 27, 1990, published Jun. 23, 1990 under Publication No. 90-4390), and water-permeable asphalt concrete and water-permeable ceramic which are already in the market.

However, conventional water-permeable pavement materials have had the following problems.

Figure 3:
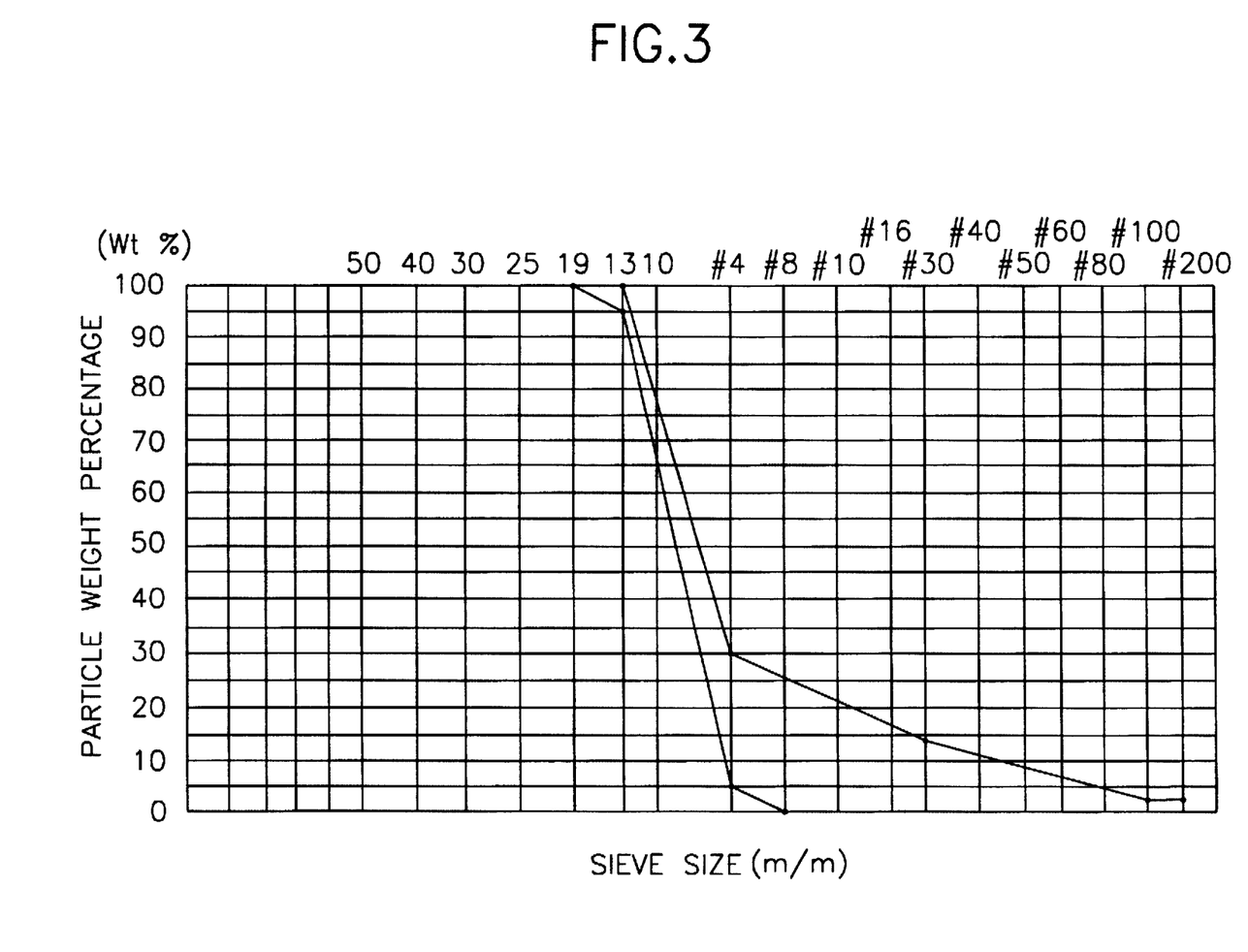
FIG. 3 is a sieve analysis graph of conventional water-permeable concrete having the maximum particle size of 13 mm.

Firstly, as seen in a sieve analysis curve in FIG. 3, the particle pass rates of aggregate having the maximum particle size of 13 mm used for conventional colored water-permeable concrete were 95–100% measured by a 13-mm sieve, 5–40% by Sieve No. 4 (4.76 mm), 0–27% by Sieve No. 8 (2.5 mm), 0–14% by Sieve No. 30 (0.6 mm), 0–2% by Sieve No. 100 (0.15 mm), and 0–1% by Sieve No. 200 (0.074 mm). The analysis showed that conventional water-permeable concrete has had some problems since it has had a relatively narrow range of the particle size of 13 mm to 4.76 mm: that is, the surface of the concrete has been rather rough due to high surface porosity, particles have been easily broken away due to external shocks, and the strength of the concrete has been lowered due to water penetrated into the pavement material.

Particularly, using conventional permeable concrete under the compression strength of more than 240 kg/cm$^2$ creates a sponge phenomenon which is rising of one portion while hardening another portion of the pavement. Also, the entire pavement material has to be mixed with a coloring material during the coloring process, which means the amount of the coloring material is considerable. Still further, internal pores may be subject to corrosion due to acidic rain water, etc.

In paving the roads by conventional water-permeable concrete, care must be taken for at least one day after aging is begun because footsteps remain on the pavement if a person walks on it even when an aging sheet is covered after a pounding process. Therefore, conventional colored water-permeable concrete has not been proper for the pavement of general roadways, but for that of lightly used sidewalks, public squares, parking lots, and roadways for small-sized automobiles.

Secondly, the pavement process of conventional water-permeable asphalt concrete includes mixing asphalt, aggregate of 13 mm size, and $CaCO_3$ at 140°–180° C., spreading, and finishing by roller pounding. For roadway pavement, the strength, i.e., the stability of asphalt concrete should be more than 500 kg; however, conventional asphalt concrete has a stability of less than 300 kg, and therefore, a further strengthening process is necessary for roadway pavement.

Also, conventional asphalt concrete has been soft, and therefore, its permeability has been rapidly lowered especially during summer time since foreign materials such as dust tend to attach to the concrete. In an aspect of production cost, in case black asphalt is used as a raw material, brown asphalt concrete can be obtained by using a red coloring material, whereas in case other colors are desired for asphalt concrete, expensive plastic resins are required thus raising the production cost. Use of plastic resins may lower durability of the concrete. Lower durability may also come from corrosion of internal pores when moisture such as rain water is introduced.

Thirdly, a conventional water-permeable ceramic pavement material has been manufactured by mixing artificial aggregate with a color selected from various colors and an epoxy resin. However, such artificial aggregates and epoxy resins are expensive and require plastering, and therefore, the overall construction tends to be slow and may lack flatness.

Raw materials have to be preserved in a dry state, and the to-be-paved road surfaces have to be maintained in their dry state. These requirements exclude working conditions of early mornings as well as evenings since it is damp during those times. Also, rainy days are not proper for the construction. Further, epoxy resins lose their initial strengths as time goes on, which means that conventional ceramic pavement materials are inferior in durability.

SUMMARY OF THE INVENTION

The present invention solves the above problems. An object of the present invention is to provide a paving method of water-permeable concrete which can be used for heavy traffic roads as well as highways. This object can be achieved by reducing the amount of cement used while maintaining a sufficient strength by lowering surface porosity while raising the number of minute internal pores thus increasing the optimum dimensions of aggregate and decreasing a reciprocal number of the number of particles per volume; by facilitating purchase of raw materials by using those used for general concrete pavement; by preventing forming of footsteps even after aging sheets are covered; and by increasing fineness and strength of surface particles.

It is another object of the present invention to provide a paving method of fine water-permeable concrete which is fine and thin since water glass powder, sand, cement, pigment, etc. are utilized; has fast construction speed; has low production cost since cement is used; can maintain lasting coloring due to transparency of glasses; can be produced in various colors; and has superior strength since broken stones are mixed into.

The paving method of water-permeable concrete to achieve the first object of the present invention is comprised of the steps of spreading and pounding of a sand filter layer having a coefficient of water permeability of more than $10\times10^{-4}$ cm/sec and a rubble layer having a coefficient of water permeability of more than $10\times10^{-2}$ cm/sec on the consolidated ground; mixing crude aggregate for a base layer, cement of 250 to 500 kg/m³, and water at a water-cement ratio of 25–40%, spreading the mixture on the rubble base layer, and pounding the materials; mixing crude aggregate for a surface layer, cement of 250 to 500 kg/M³, water at a water-cement ratio of 25–40%, and at least one polymer selected from a group consisting of an emulsion-type acrylic resin, emulsified asphalt, and SBR latex of less than 20% of the weight of the cement used, spreading the mixture on the base layer of the water-permeable concrete, and paving the surface layer of the water-permeable concrete by pounding; and covering the paved surface layer of the water-permeable concrete with vinyl or the like and aging for more than one day, mixing at least one polymer selected from a group consisting of an emulsion-type acrylic resin, an epoxy resin, urethane, emulsified asphalt and latex, with water, spreading the mixture on the base layer of the water-permeable concrete, and aging the concrete.

The above aggregate for the base layer has the maximum particle size of 40 mm, and has the particle pass rates in weight % of 100% measured by a 50-mm sieve, 95–100% by a 40-mm sieve, 75–95% by a 25-mm sieve, 15–55% by a 10-mm sieve, 0–2% by Sieve No. 4, 0–10% by Sieve No. 10, and 0–5% by Sieve No. 40.

The above aggregate for the surface layer has the maximum size of 19 mm, and has the particle pass rates in weight % of 100% measured by a 25-mm sieve, 95–100% by a 19-mm sieve, 20–60% by a 10-mm sieve, 0–20% by Sieve No. 4, 0–10% by Sieve No. 10, and 0–5% by Sieve No. 40.

The paving method of water-permeable concrete to achieve the second object of the present invention is comprised of the steps of spreading and pounding of a sand filter layer having a coefficient of water permeability of more than $10\times10^{-4}$ cm/sec and a rubble layer having a coefficient of water permeability of more than $10\times10^{-2}$ cm/sec; mixing crude aggregate, cement and water in a proper ratio to have porosity of 10–20% and a coefficient of water permeability of more than $10\times10^{-2}$ cm/sec, spreading the mixture on the rubble base layer, and paving the base layer of the water-permeable concrete by pounding; mixing crushed waste glass, fine rubble, cement of 250–500 kg/m³, water at a water-cement ratio of 25–40%, and at least one polymer selected from a group consisting of an emulsion-type acrylic resin, emulsified asphalt, and SBR latex of 10–50% of the weight of the cement used with respect to 50% of solid material, spreading the mixture on the base layer of the water-permeable concrete within an hour after its paving, and paving the surface layer of the fine water-permeable concrete by pounding; and covering the paved fine surface layer of the water-permeable concrete with vinyl or the like and aging for more than one day, mixing at least one polymer selected from a group consisting of an emulsion-type acrylic resin, an epoxy resin, urethane, emulsified asphalt and latex, with water, spreading the mixture on the base layer of the water-permeable concrete, and aging the materials.

The above waste glass powder and fine rubble have particle pass rates in weight % of 80–100% measured by a 3-mm sieve, and less than 10% by a 1-mm sieve.

BRIEF DESCRIPTION OF THE DRAWINGS

A more complete appreciation of this invention, and many of the attendant advantages thereof, will be readily apparent as the same becomes better understood by reference to the preferred embodiments of the invention when considered in conjunction with the accompanying drawings in which.

DESCRIPTION OF THE PREFERRED EMBODIMENTS

Hereinafter preferred embodiments of the present invention are described with reference to the accompanying drawings.

Figure 1:
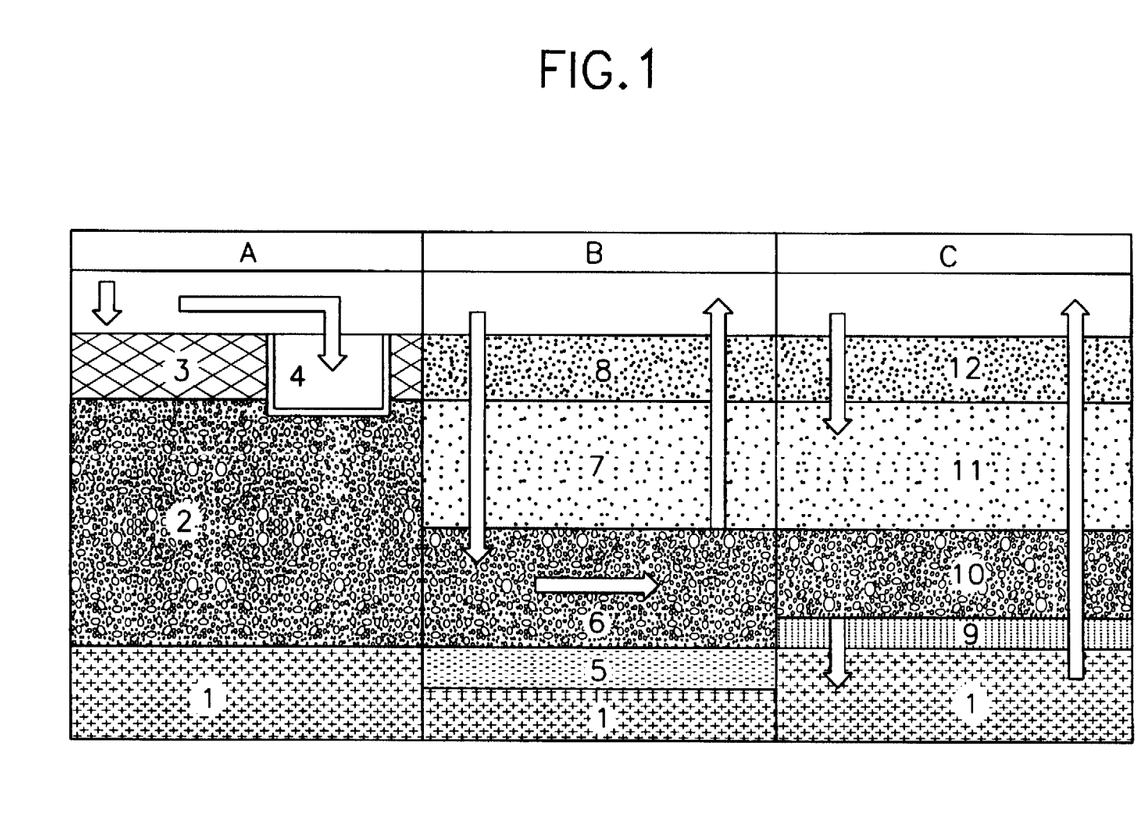
FIG. 1 is a schematic cross-sectional diagram of a general pavement, a water-draining pavement, and a water-permeable pavement for comparison.

FIG. 1 is a schematic comparative cross-sectional diagram of a general pavement A, a water-draining pavement B, and a water-permeable pavement C. In this figure, arrows show the passage of water.

A general pavement A is comprised of the consolidated ground 1, a base layer and its auxiliary 2, and an asphalt or cement concrete layer 3 accumulated in order as well as water drain outlets 4 formed at one edge, through which rain water outflows to watercourses, public sewage disposal plants, rivers, etc.

A water-draining pavement B is comprised of the consolidated ground 1, a water-impermeable cement stabilization treatment layer 5, a drainage layer 6 made of granular materials, a water-permeable concrete layer 7 for a base layer, and a water-permeable concrete layer for a roadway pavement accumulated in order. If water such as rain water is flowed into the water-draining pavement B, it moves through a water-permeable concrete layer 8 for a roadway pavement, a water-permeable concrete layer 7 as a base layer, and a drainage layer 6 made of granular materials, and a portion of water is evaporated into air according to capillary phenomenon.

Lastly, a water-permeable pavement C is comprised of the consolidated ground 1, a filter layer 9, a granular material layer 10, a water-permeable concrete layer 11 for a base layer and a thin water-permeable concrete layer 12 for a surface layer accumulated in order. If water such as rain water is flowed into a water-permeable pavement C, it moves to the ground 1 through a thin water-permeable concrete layer 12 for a surface layer, a water-permeable concrete layer 11 for a base layer, a granular material layer 10, and a filter layer 9, and a portion of water is evaporated into air.

Figure 2:
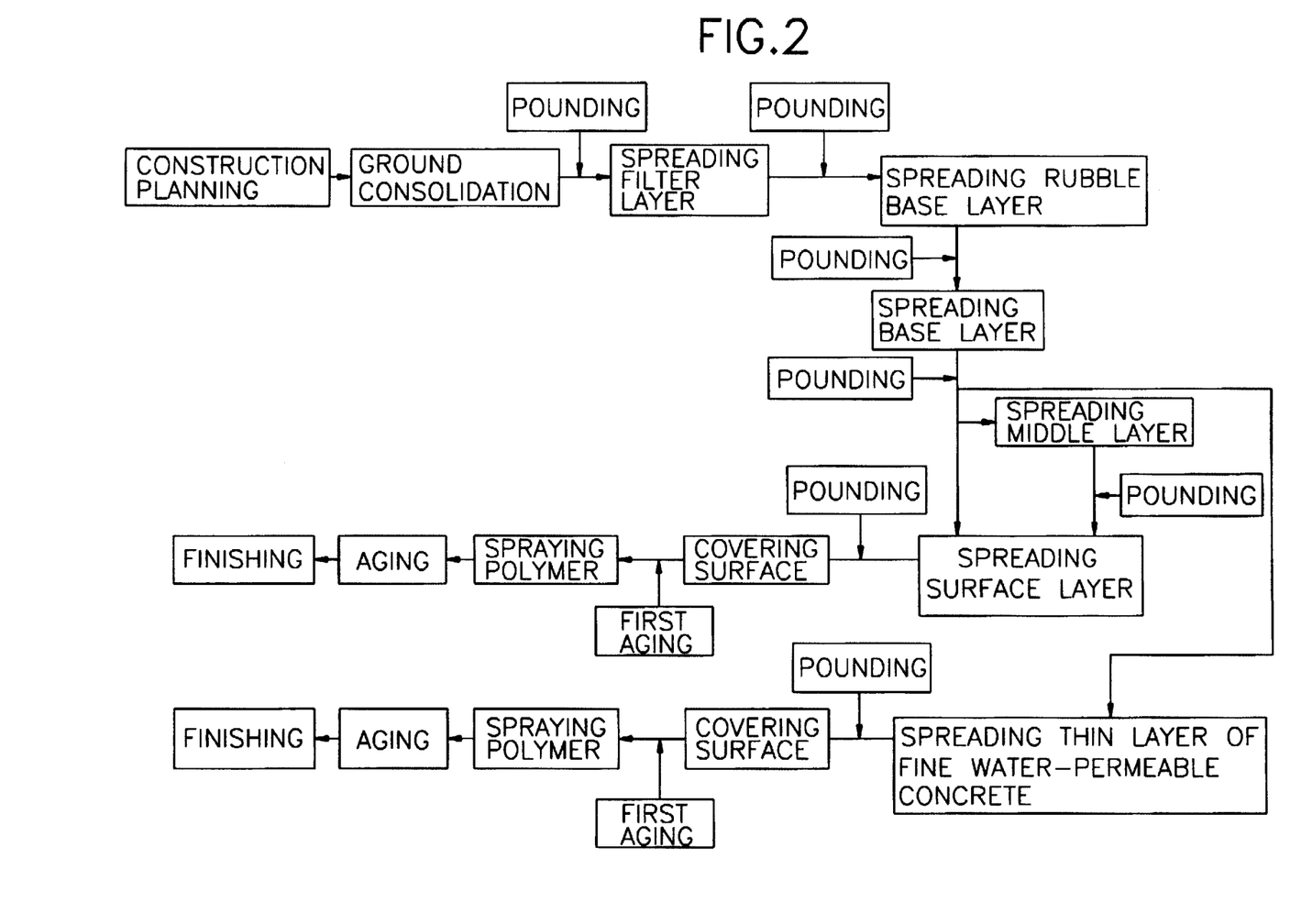
FIG. 2 is a block diagram of construction order for a water-permeable pavement according to the present invention.

FIG. 2 is a block diagram of construction order for a water-permeable pavement according to the present invention. Each process is depicted as follows:

Process No. 1

Construction of a water-permeable concrete pavement should be planned to achieve water permeability, and to maintain flatness, strength, porosity, color, etc. According to the construction planning, the ground is consolidated and pounded as in a conventional water-permeable paving method. A filter layer is then spread on the ground. For a filter layer, sands having a coefficient of water permeability of more than $10 \times 10^{-4}$ cm/sec are used. A filter layer is to prevent mixing of earth with an upper base layer as well as to purify contaminated water. On the filter layer, a rubble base layer is spread in order to distribute an upper load and to store a constant amount of water for a certain period of time. The rubble base layer has a coefficient of water permeability of more than $10 \times 10^{-2}$ cm/sec, and is pounded sufficiently to obtain the maximum density at the optimum water containing ratio after being spread.

Process No. 2

The aggregate for water-permeable concrete for a base layer or for a roadway pavement should have the maximum dimensions of 40 mm, 25 mm, and 19 mm. To the aggregate, 250–500 kg/m$^3$ of cement, water at a water-cement ratio of 25–40%, and a cement delaying agent of less than 1% with respect to the weight of the cement used are mixed.

Figure 4:
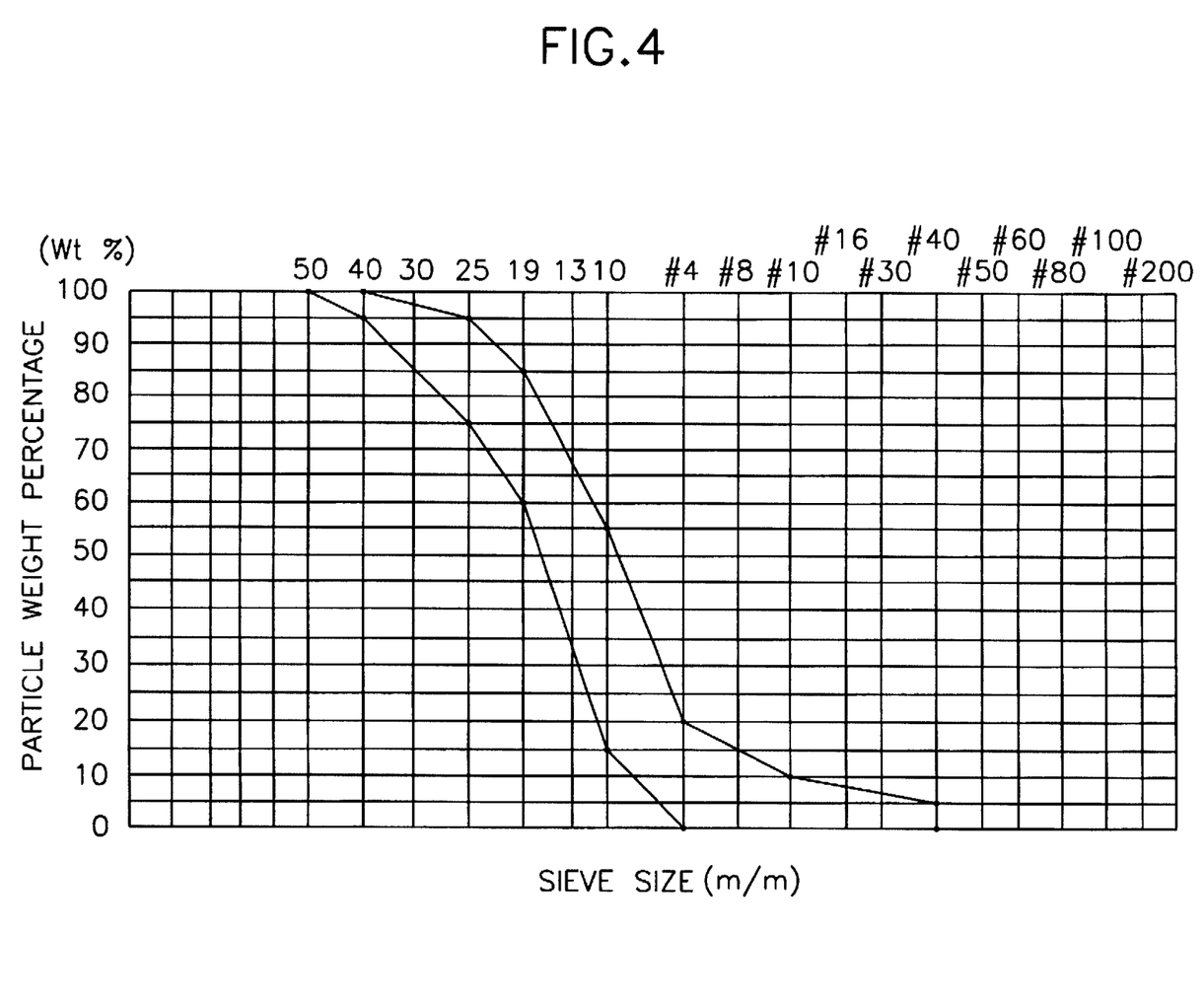
FIG. 4 is a sieve analysis graph of water-permeable concrete for a base layer having the maximum particle size of 40 mm according to the present invention.

Aggregate has significant influence on water permeability and strength, and is classified according to its use and shape. FIG. 4 shows particle size distribution of crude aggregate having the maximum dimension of 40 mm. As seen in FIG. 4, the particle pass rates in weight % were 100% measured by a 50-mm sieve, 95–100% by a 40-mm sieve, 75–95% by a 25-mm sieve, 15–55% by a 10-mm sieve, 0–2% by Sieve No. 4, 0–10% by Sieve No. 10, and 0–5% by Sieve No. 40.

Figure 5:
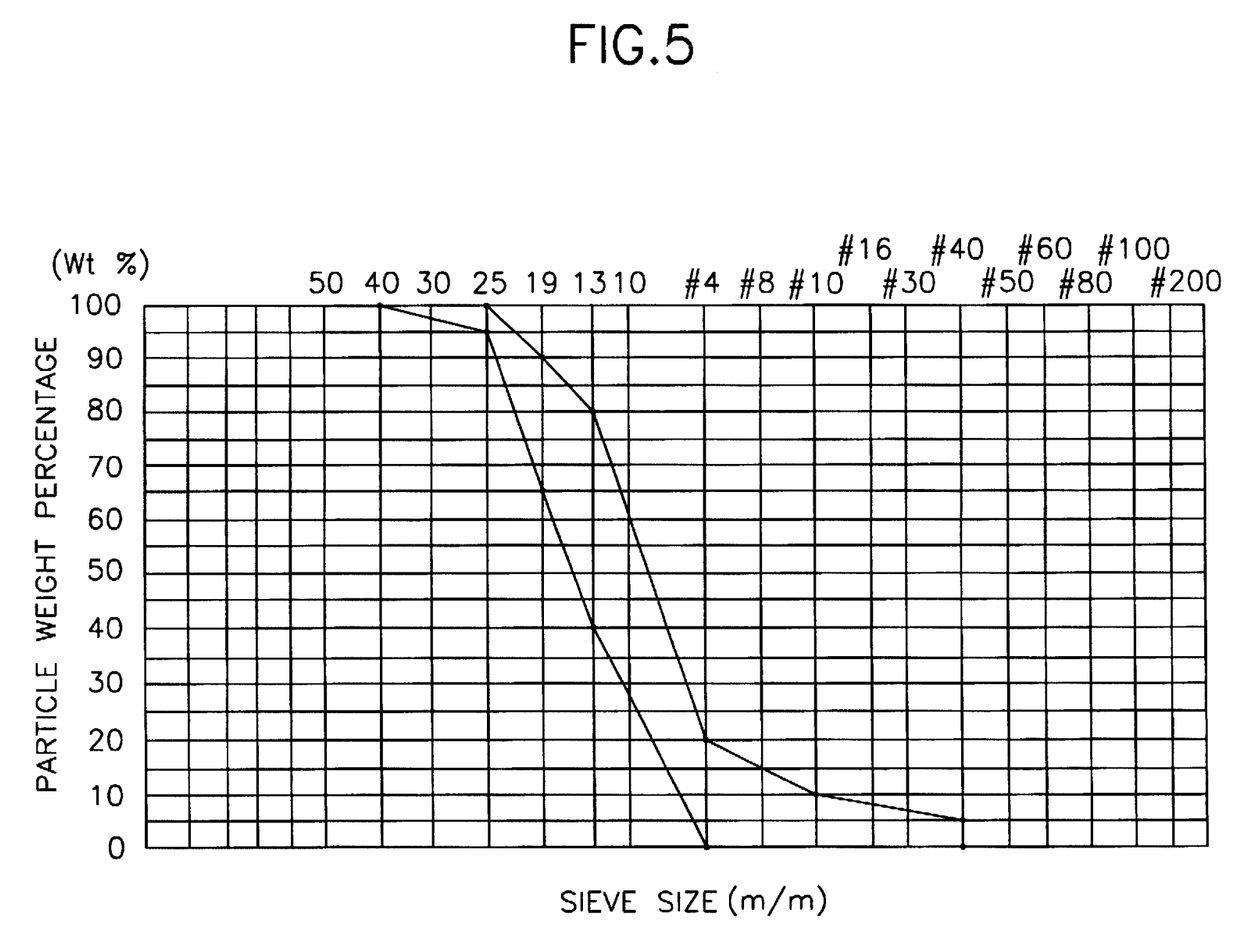
FIG. 5 is a sieve analysis graph of water-permeable concrete for middle and surface layers having the maximum particle size of 25 mm according to the present invention.

FIG. 5 shows particle size distribution of crude aggregate having the maximum dimension of 2–5 mm. As seen in FIG. 5, the particle pass rates in weight % were 100% measured by a 40-mm sieve, 95–100% by a 25-nm sieve, 65–90% by a 19-mm sieve, 40–80% by a 13-mm sieve, 0–10% by Sieve No. 10, and 0–5% by Sieve No. 40.

Figure 6:
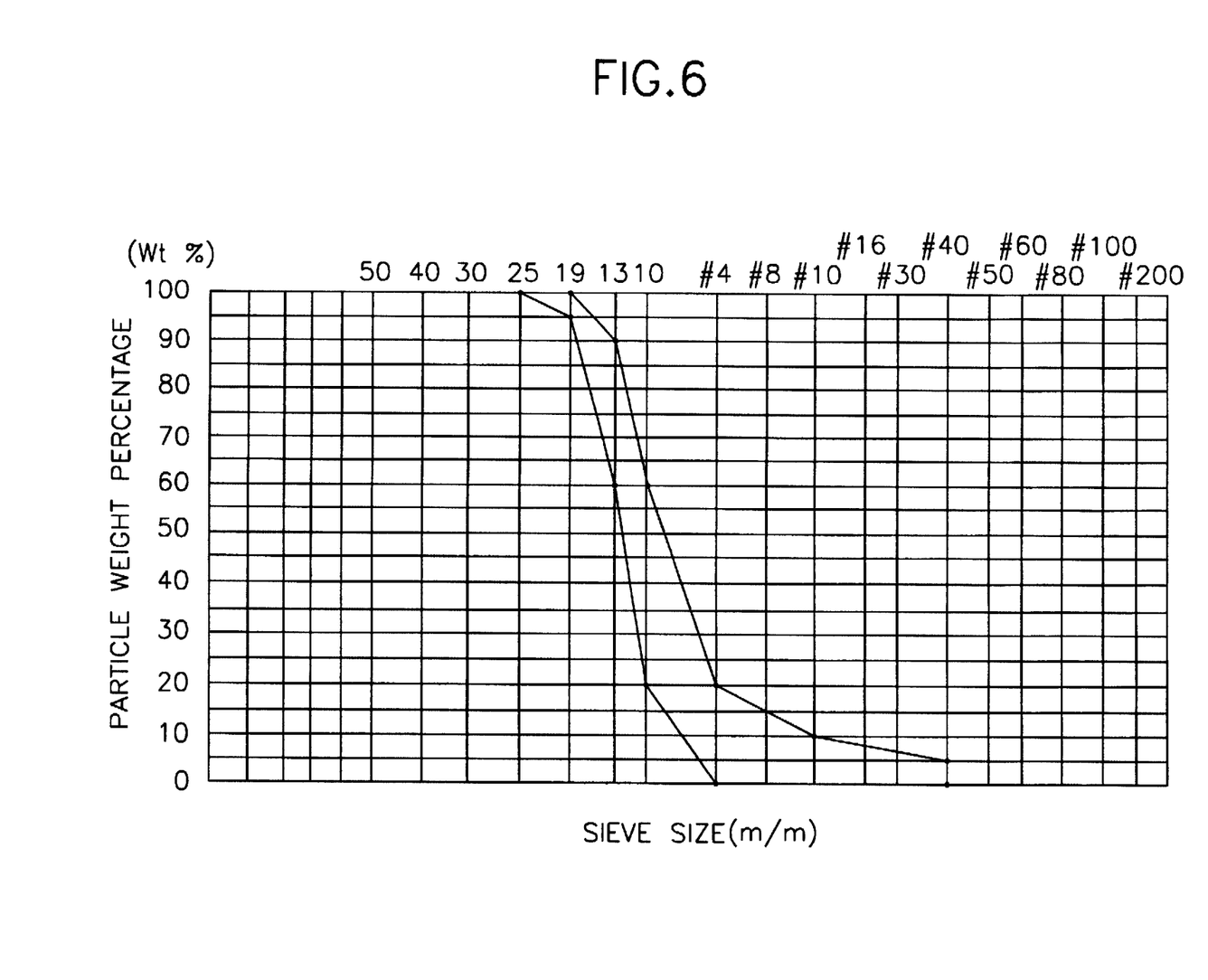
FIG. 6 is a sieve analysis graph of water-permeable concrete having the maximum particle size of 19 mm according to the present invention.

Further, FIG. 6 shows particle size distribution of crude aggregate having the maximum dimension of 19 mm. As seen in FIG. 6, the particle pass rates in weight % were 100% measured by a 25-mm sieve, 95–100% by a 19-mm sieve, 20–60% by a 10-mm sieve, 0–20% by Sieve No. 4, 0–10% by Sieve No. 10, and 0–5% by Sieve No. 40.

The above three kinds of aggregates are used selectively according to the need.

Water-permeable concrete for a roadway pavement should have a compression strength of more than 260 kg/cm$^2$ or a bending strength of more than 40 kg/cm$^2$; however, in the present invention, the compression strength is determined to be more than 200 kg/cm$^2$ and the bending strength to be more than 30 kg/cm$^2$ for the sake of varieties of the products.

Cement of 250 to 500 kg/m$^3$ is used flexibly. A water-cement ratio is determined to be 25–40%, a porosity to be 10–20%, and a coefficient of water permeability to be $10 \times 10^{-2}$ cm/sec taken into consideration of the quality of the aggregate, planned strength, a coefficient of water permeability, etc.

The amount of the aggregate included in water-permeable concrete is computed according to the following equation assuming that the amount of the cement used and the water-cement ratio are determined based on the strength.

Amount of aggregate used

=(880−(weight of water+(amount of cement used/specific gravity of cement))×specific gravity of aggregate used where 880 is the volume of water-permeable concrete for a roadway pavement per 1 m$^3$ excluding the porosity of 12%. If desired, 1 m$^3$ of the aggregate can be used at the time of producing 1 m$^3$ of water-permeable concrete.

In water-permeable concrete for a surface layer, a polymer is mixed into to control the strength and durability. Examples of such polymer include emulsion-type acrylic resins, emulsified asphalt, SBR latex, etc. The amount of the polymer used is within the range of 20% of the weight of the cement. Economically, it is desirable to use emulsified asphalt. In water-permeable concrete for a surface layer, a pigment is mixed into for coloring. An inorganic pigment within 10% range of the weight of cement used may be used. In water-permeable concrete for a surface layer, about 1.5 kg/m$^3$ of a reinforcement agent can be used for the compensation of a bending strength. Examples of a reinforcement agent include polypropylene fibers, polyethylene fibers, and carbon fibers, and if necessary, iron fibers can be also used. If time required for transportation is taken into consideration, for a cement delaying agent, KSF 2560 (chemical admixture for concrete, JIS standard A 6204) or ASTM C 494 (chemical admixture for concrete, standard specification) can be used within the range of 1% of the amount of cement used. SiO$_2$, fly ash, and micro silica fume can be also used.

The above-described materials are measured and mixed. Water-permeable concrete measured and mixed as above is transferred to the working site by a dump truck, is spread by using a finisher for asphalt concrete, and is pounded by a tandem roller, a tire roller, etc.

Water-permeable concrete has to be pounded sufficiently to achieve the required density of more than that of a sample for strength testing. The standard of pounding differs according to the aggregate used, conditions of working sites, heaviness of equipments used, etc., and therefore, is determined before the construction. However, generally, 8–12 poundings by a 8-ton tandem roller or 4 poundings by a 12-ton tire roller are deemed to be proper for 15 cm-thick pavements.

Process No. 2-1

In case water-permeable concrete prepared in Process No. 2 is used for a base layer of a thin fine water-permeable concrete layer, not for a surface layer of roadways, after completion of Process No. 2, fine water-permeable concrete has to be spread before surface moisture is evaporated or within an hour after completion of pounding in order to improve binding strength with fine water-permeable concrete.

Fine water-permeable concrete, after aging, should have a porosity of more than 7%, a coefficient of water permeability of more than $10 \times 10^{-3}$ cm/sec, and a compression strength of 150–400 kg/cm$^2$. In order to meet these requirements, cement of 250–500 kg/m$^3$ is used, a water-cement ratio is determined within the range of 25–40% taking into consideration of a coefficient of water permeability, and the amounts of crushed waste glass and fine rubble are calculated according to the following equation:

Amount of aggregate used

=(930−(weight of water+(amount of cement used/specific gravity of cement))×specific gravity of aggregate used where 930 is the volume of 1 m³ of fine water-permeable concrete excluding porosity of 7%.

Accordingly, $G_{max}$=(930−((250×0.25)+250/3.15))×2.70 =2128 kg/m³

$G_{min}$=(930−((500×0.40)+500/3.15))×2.50 =1428 kg/m³.

Therefore, the amount of the aggregate used is determined to be within the range of 1,430−2,100 kg/m³, and the amounts of crushed waste glass and fine rubble are then determined accordingly.

The crushed waste glass to be used should have a pass rate in weight % of 80−100% measured by a 3-mm sieve and of less than 10% by a 1-mm sieve, and its used amount is 10−50% of the total weight of fine rubble used. The fine rubble to be used should have a pass rate in weight % of 80−100% measured by a 3-mm sieve and of less than 10% by a 1-mm sieve, and their used amount is 50−90% of the total weight of the aggregate used.

In case of using crushed waste glass, compared to using a general rubble aggregate, generation of foams within the concrete is increased five times to ten times, and contributes to water permeability after spreading of the material. If glass is not used, in order to obtain the same degree of water permeability, a water-cement rate should be lowered by more than 5%, however, evaporation of moisture during construction creates difficulties in construction.

To improve a binding strength with water-permeable concrete for roadway pavement as well as a physical strength of fine water-permeable concrete, an emulsion-type polymer is used, of which examples include epoxy resins, acrylic resins, asphalt, latex, etc. The polymer should have superior durability against weather. The amount of the polymer used is 10−50% of the weight of cement used based on 50% of the solid material. The amount of a cement delaying agent to be used should be less than 2% of the weight of cement used taking into consideration of transportation, spreading, pounding time, etc., and for coloring, an inorganic coloring agent having superior durability against weather is used in an amount of less than 20% of the weight of cement used.

The materials selected and measured as described above are mixed by a mixer, and fine water-permeable concrete is spread in a thickness of less than 3 cm on water-permeable concrete for roadway pavement by using a thin-layer spreader or manually. After spreading, the concrete is pounded twice to five times using a roller or a compactor to obtain a density required for maintaining flatness.

Process No. 3

After completion of Process 2 or 2-1, the concrete is covered by vinyl or a thermal covering, is aged for more than one day, and is spread by a polymer for its adsorption after a covering is removed.

Small pores of water-permeable concrete are filled with a polymer, strength of the concrete can be enforced since pored are covered with a polymer, and lowering of strength and corrosion due to moisture introduced can be prevented.

Examples of a polymer for adsorption process include emulsion-type acrylic resins, epoxy resins, urethane, emulsified asphalt, latex, etc. It is desired to mix an emulsion-type acrylic resin, which has superior durability against water and simple directions for use, and water, at a resin to water ratio of 1:5 to 1:10, and to spread the mixture more than twice for sufficient adsorption into water-permeable concrete.

After spreading, vertical and horizontal lines are impressed generally at intervals of 3−10 m for contraction horizontal lines, of 30−100 m for expansion horizontal lines, and of 2.5−5 m for vertical lines.

Accordingly, spreading of a thin fine water-permeable concrete layer having a compression strength of 150−400 kg/cm², a porosity of more than 7%, and a coefficient of water permeability of more than 10×10⁻³ cm/sec is completed.

The water-permeable concrete for roadway pavement constructed as described above is subject to testing of compression strength, water containing ratio, and porosity; and further after completion of paving, density, pounding rate, coefficient of water permeability, and color.

At a production stage, for testing of compression strength, water-permeable concrete for roadway pavement is pounded 50 times each for three separate layers by using a 2.5 kg pounding road on a 50 mm circular pounding plate from a height of 300 mm in case of using a 10−20 cm sampling mold. A sample is manufactured by filling the cylinder with water-permeable concrete and pressing its surface sufficiently by a triangular rod. At this time, the bottom and upper portion of the sample should be covered by cement powders and should not show any pores on their surfaces. After two days, molding is released, and a sample is immersed into a mixture of an acrylic resin and water at a resin to water ratio of 1:5 to 1:10 based on 50% of solid material under the same conditions as actual conditions.

A sample for testing bending strength is constructed by pounding the concrete in two layers by using a 4.5 kg pounding rod on a 50 mm circular pounding plate from a height of 450 mm. The number of pounding is determined from the area of a testing mold, and finishing is the same as for a sample for compression testing.

The strength of fine water-permeable concrete is tested according to KSL 5105 (testing method of compression strength of hydraulic cement mortar, cement testing method ISO 699 standard, strength measurement method).

The cylinder thus formed is tested 28 days after being aged by atmospheric moisture for compression strength testing method KSF 2405 (concrete compression strength testing method, ISO 3893 standard concrete—classification according to compression strength, ISO 4012 standard concrete—compression strength measurement method of reagent), KSF 2408 (testing method for bending strength of concrete, ISO 4013 standard concrete—measurement method of bending strength of reagent), and KSL 5105 (testing method of compression strength for hydraulic cement mortar).

A water containing ratio is for maintaining a constant water-cement ratio for water-permeable concrete which is difficult in slumping test. It is computed according to the following equation from the weights of water-permeable concrete in wet and dry states:

Water containing ratio=[(weight in wet state−weight in dry state)/weight in wet state)]×100

Porosity of water-permeable concrete is computed from a ratio of theoretical unit volume weight of absolute unit volume weight of wet water-permeable concrete and actual unit volume weight of water-permeable concrete, and a unit volume test employs unit volume for the manufacturing method of a sample for compression strength measurement. The unit volume weight of absolute unit volume weight is the weight of concrete per 1 m³ when packed without air and pores, and its unit is kg/m³.

Therefore, porosity is computed according to the following equation:

Porosity=100—((unit volume weight of water-permeable concrete/ unit volume weight for absolute unit volume weight)×100)

The products at the time of construction are classified according to pounding rate, coefficient of water permeability, and color; and pounding rate depends on density and is computed from the density of the sample for compression strength test as well as that of the core product at working sites.

Pounding rate=(density of core product at working sites/density of sample)×100

A more accurate pounding rate can be obtained by sampling the core product from a mold for strength testing.

The density of water-permeable concrete is computed using a paraffin as it has a large number of pores.

Density=A/(D—E—((D—A)/F))

where A is the weight of sample in air, D is the weight of covered sample in air, E is the weight of covered sample in water, and F is gravity of a paraffin.

Figure 7:
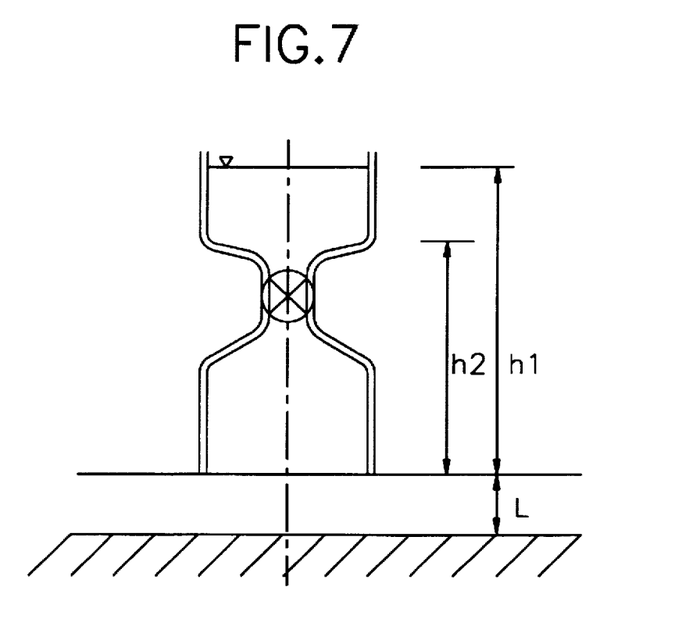
FIG. 7 is a cross-sectional view of a water permeability detector used in the present invention.

A coefficient of water permeability depends on the water permeability testing method at working sites by a detector shown in FIG. 7, and is computed according to the following equation:

$KP=(L \times a)/(a(t_2-t_1)) \log e (h_1/h_2)$ where L is the height of paving material, a is a cross-sectional area of a container, A is a water-permeated cross-sectional area, $t_2$ and $t_1$ are duration of water permeation, $h_1$ is a water level at the beginning of testing, and $h_2$ is a water level at the completion of testing.

Color of the concrete is determined by consulting the user, and its samples are made and compared with the products.

Hereinafter preferred embodiments of the present invention are illustrated.

First Preferred Embodiment

Red-colored water-permeable pavement having compression strength of 240 kg/cm$^2$ is constructed for a traffic paving material for Traffic B roadway of 10 m width and 10 km length. Here, Traffic B refers to five-year old roadways having 250–1000 large-sized automobiles per day.

Figure 8:
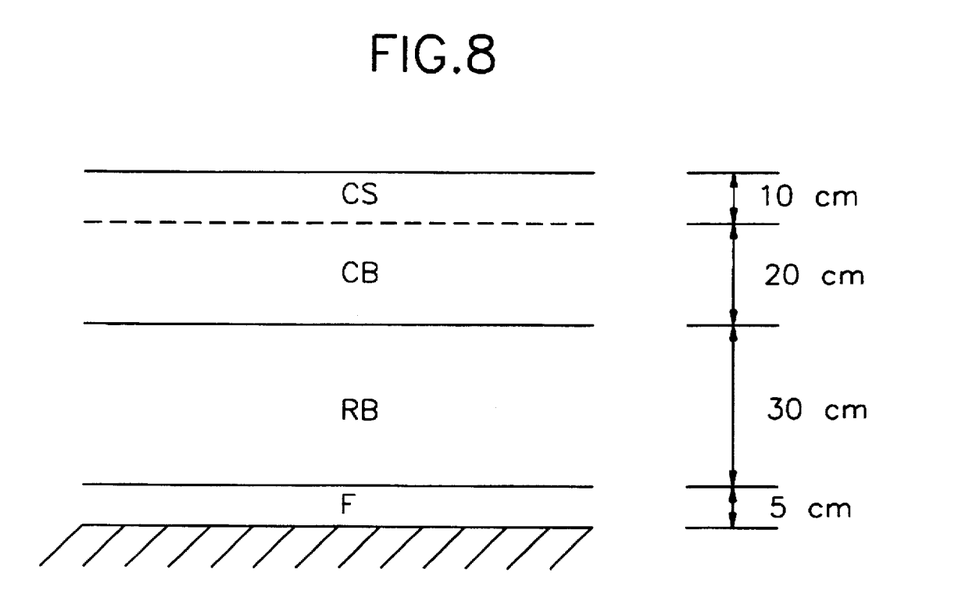
FIG. 8 is a cross-sectional view of a pavement constructed according to the first preferred embodiment of the present invention.

FIG. 8 is a standard cross-sectional diagram of water-permeable concrete for roadway pavement constructed according to the first preferred embodiment of the present invention.

Process No. 1

The ground is consolidated and sufficiently pounded, and sands of 5,000 m$^3$ were spread as a filter layer F in a thickness of 5 cm using a grader and pounded by a roller. A rubble base layer RB of 30,000 m$^3$ was spread by a grader using rubble of 40 mm, water was sprayed, and pounded. At this time, a rubble base layer has to be spread and pounded as for any other general base layers, and a coefficient of water permeability should be more than 10×10$^{-2}$ cm/sec.

Process No. 2

A water-permeable concrete base layer CB in a thickness of 40 mm was spread as follows:

General Portland cement was used in an amount of 350 kg/m$^3$, and a water-cement ratio was determined to be 35% taking into consideration of the water containing ratio to have a unit weight of 122 kg/m$^3$. The amount of the aggregate used was 1,714 kg/m$^3$ according to the equation, and 1.75 kg/M$^3$ of a cement delaying agent was used. These materials were mixed by a mixer, transferred to working sites by a dump truck. The total 20,000 m$^3$ of asphalt was spread by a finisher, and pounded 10 times by a tandem roller.

Table 1 and Table 2 below show particle size distribution and mixing rate, respectively, of the above water-permeable concrete of 40 mm.

TABLE 1

| Sieve Size | % of Aggregate passed through Sieve | | | | | | |
|---|---|---|---|---|---|---|---|
| | 50-mm Sieve | 40-mm Sieve | 25-mm Sieve | 10-mm Sieve | Sieve #4 | Sieve #10 | Sieve #40 |
| Actual % | 100 | 98.5 | 80.4 | 30.2 | 14.7 | 6.4 | 2.2 |
| Expected % | 100 | 95–100 | 75–95 | 15–55 | 0–20 | 0–10 | 0–5 |

TABLE 2

| Mixing Rates | Weight of Components (kg/m$^3$) | | | |
|---|---|---|---|---|
| | water | cement | aggregate | delaying agent |
| 40–240 | 122 | 350 | 1,714 | 1.75 |
| | (compression strength 240 kg/cm$^{-2}$) | | | |

On the base layer of water-permeable concrete, a surface layer CS of water-permeable concrete, i.e., a water-permeable concrete layer of 19 mm, was spread.

General Portland cement was used in an amount of 360 kg/m$^3$, and a water-cement ratio was determined to be 36% taking into consideration of the water containing ratio to have a unit weight of 130 kg/m$^3$. The amount of the aggregate used was 1,685 kg/m$^3$ according to the equation, and an emulsion-type acrylic resin of 10 kg/m$^3$ based on 50% solid material was used taking into consideration of durabilities against weather and shocks. 0.9 kg/m$^3$ of reinforcement fibers of 12 mm length, 1.8 kg/m$^3$ of a delaying agent, and 18 kg/m$^3$ of a red inorganic coloring agent were used. These materials were mixed by a mixer, transferred to working sites by a dump truck. The total 10,000 m$^3$ of asphalt was spread by a finisher, pounded eight times by a tandem roller, and again pounded four times by a tire roller.

Table 3 and Table 4 below show particle size distribution and mixing rate, respectively, of the above water-permeable concrete of 19 mm.

TABLE 3

| Sieve Size | % of Aggregate passed through Sieve | | | | | |
|---|---|---|---|---|---|---|
| | 25-mm Sieve | 19-mm Sieve | 10-mm Sieve | Sieve #4 | Sieve #10 | Sieve #40 |
| Actual % | 100 | 100 | 40.5 | 16.4 | 7.2 | 3.0 |
| Expected % | 100 | 95–100 | 20–60 | 0–20 | 0–10 | 0–5 |

TABLE 4

| Mixing Rates | Weight of Components (kg/m$^3$) | | | | | |
|---|---|---|---|---|---|---|
| | water | cement | aggregate | delaying agent | resin | reinf. fiber | pigment |
| 19–240 | 130 | 360 | 1,685 | 1.8 | 10 | 0.9 | 18 |
| | (compression strength 240 kg/m$^2$) | | | | | | |

Process No. 3

The surface layer of the concrete was pounded, covered by vinyl, and aged for three days. After aging, vinyl was uncovered, 300 kg of an emulsion-type acrylic resin based on 50% solid material and 2,000 kg of water were spread twice, compression lines were impressed at 5 m intervals up to one third portion from the surface layer, compression lines were impressed at 50 m intervals cutting through more than 7 mm, and filled with a back-up agent and silicon. After 14 days, the construction was completed and ready to be used.

The result of a quality test for water-permeable concrete thus constructed is shown in Table 5 below.

TABLE 5

|  | Compression Strength (kg/cm$^2$) | Porosity (%) | Pounding Rate (%) | Coefficient of Water Permeability (cm/sec) | Color |
|---|---|---|---|---|---|
| Actual 40 mm | 265 | 13.7 | 101.4 | $4.1 \times 10^{-1}$ | — |
| Values 19 mm | 271 | 12.6 | 102.5 | $5.5 \times 10^{-1}$ | proper comp. |
| Standard | >240 | >10 | >100 | $>10 \times 10^{-2}$ | with sample |

In Table 5, comp. with sample means comparing the color of the final product with that of samples prepared for color testing.

Second Preferred Embodiment

In the second preferred embodiment of the present invention, construction of a parking lot of 100 m$^2$ by using a green fine water-permeable concrete layer is described. For this purpose, paved were a filter layer of 5 cm, a rubble base layer of 15 cm, a 25 mm base layer of water-permeable concrete of 9 cm having compression strength of 210 kg/cm$^2$, and fine water-permeable concrete of 1 cm having compression strength of 210 kg/cm$^2$; and after aging, the concrete is to have a coefficient of water permeability of more than $10 \times 10^{-3}$ cm/sec and porosity of more than 7%.

Figure 9:
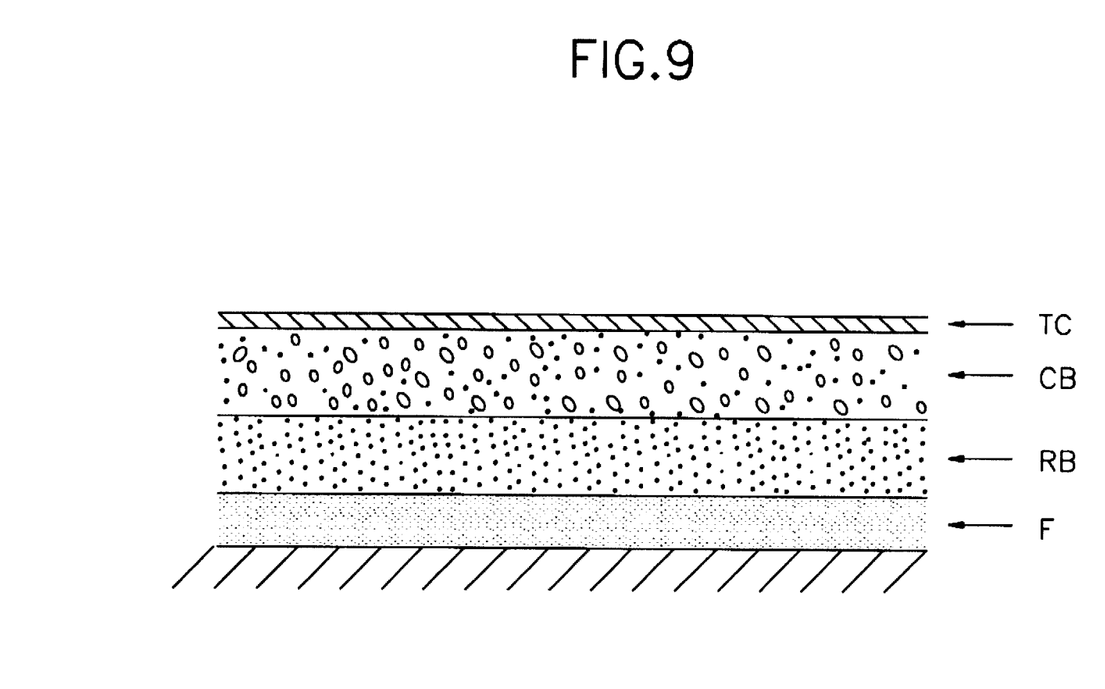
FIG. 9 is a schematic cross-sectional view of fine water-permeable concrete constructed according to the second preferred embodiment of the present invention.

FIG. 9 shows a standard cross-sectional view of fine water-permeable concrete constructed according to this embodiment of the present invention.

Process No. 1

The ground was consolidated, and a sand filter layer F of 5 m$^3$ having a coefficient of water permeability of $10 \times 10^{-3}$ cm/sec was spread and pounded by a roller. Then a rubble base layer RB of 15 m$^3$ having a coefficient of water permeability of more than $10 \times 10^{-2}$ cm/sec was spread to have the maximum density which is dependent on the maximum water containing ratio.

Process No. 2

Water-permeable concrete of 9 m$^3$ for a base layer CB was prepared by mixing and spreading 120 kg/m$^3$ of water, 320 kg/m$^3$ of cement, 1,712 kg/m$^3$ of aggregate, and 0.96 kg/m$^3$ of a delaying agent to have a coefficient of water permeability of $10 \times 10^{-2}$ cm/sec, a porosity of more than 10%, and a strength of more than 210 kg/cm$^2$. The concrete was then pounded.

Process No. 2-1

After completion of pounding of the base layer CB of water-permeable concrete, a surface layer TC of fine water-permeable concrete has to be spread before the evaporation of moisture or within an hour after pounding. In order to spread the surface layer TC of fine water-permeable concrete, 150 kg/m$^3$ of water, 370 kg/m$^3$ of white cement, and waste glass and fine rubble which have pass rates in weight % of 80–100% measured by a 3-mm sieve and of less than 10% by a 1-mm sieve were mixed. The amount of waste glass used is 30% with respect to 70% of rubble. As the amount of the aggregate G is computed according to an equation:

$$G = \{930 - (150 + (370/3.15))\} \times 2.60 = 1,723 \text{ kg/M}^3,$$

the amount of waste glass to be used is computed to be 1,723 kg/m$^3 \times 0.3 = 517$ kg/m$^3$, and that of fine rubble to be 1,723 kg/m$^3 \times 0.7 = 1,206$ kg/M$^3$.

As a polymer, an acrylic resin in an amount of 20% of the weight of cement used based on 50% solid material, i.e., 370 kg/m$^3 \times 0.2 = 74$ kg/m$^3$, was used. A delaying agent in an amount of 0.3% of the weight of cement used, i.e., 370 kg/m$^3 \times 0.03 = 11.1$ kg/m$^3$ was used. As a coloring agent, chromium oxide, which is a green inorganic compound, was used in an amount of 3% of the weight of cement used, i.e., 370 kg/m$^3 \times 0.03 = 11.1$ kg/m$^3$. 1 M$^3$ of the raw materials was mixed sufficiently by a mixer. At this time, mixing can be performed in several times for sufficient mixing.

The mixed fine water-permeable concrete was spread manually on the base layer CB of water-permeable concrete prepared in Process No. 2, and pounded compactly to have a sufficient strength, a porosity of more than 7%, a coefficient of water permeability of $10 \times 10^{-3}$ cm/sec, and a sufficient density. After pounding, the concrete was covered by vinyl to prevent evaporation of moisture, was spread by water after one day, and was dried after two days.

Process No. 3

Once the surface of the concrete is dried, an epoxy primer based on 50% solid material was sprayed on the surface of fine water-permeable concrete by a sprayer. 30 kg of the compound was used in order to reach the base layer of water-permeable concrete. The concrete was aged in air for more than 7 hours, after which walking was allowed, lines were impressed at 5 m intervals, and traffic was allowed after 14 days. The test result of a thin pavement layer of fine water-permeable concrete is shown in Table 6.

TABLE 6

|  |  | Compression Strength (kg/cm$^2$) | Porosity (%) | Coefficient of water Permeability (%) |
|---|---|---|---|---|
| Water-permeable concrete base layer | Actual value | 264 | 17 | $5.1 \times 10^{-1}$ |
|  | Standard | >210 | >10 | $>10 \times 10^{-2}$ |
| Fine water-permeable concrete surface layer | Actual value | 247 | 11 | $9.7 \pm 10 - 1$ |
|  | Standard | >210 | >7 | $>10 \times 10^{-3}$ |

|  |  | Color | Flatness | Pounding Rate |
|---|---|---|---|---|
| Water-permeable concrete base layer | Actual value | — | 3 within ±5 mm | 103 |
|  | Standard | — | measured by 3-m straight ruler | >100 |
| Fine water-permeable concrete surface layer | Actual value | same | 2 within ±3 mm | 102 |
|  | Standard | comp. with sample | measured by 3-m straight ruler | >100 |

While the invention has been described in terms of preferred embodiments, those skilled in the art will recognize that the invention can be practiced with modification within the spirit and scope of the appended claims.

What is claimed is:

1. A paving method of forming water-permeable concrete comprising the steps of:
- spreading and pounding a sand filter layer on consolidated ground;
- spreading and pounding a rubble base layer on the sand filter layer;
- paving a base layer of water-permeable concrete comprising
  - mixing crude aggregate, cement and water to form a first mixture,
  - spreading the first mixture on the rubble base layer, and pounding the first mixture on the rubble layer;
- paving a surface layer of the water-permeable concrete comprising
  - mixing crushed glass, fine rubble, cement, water and at least one polymer selected from a group consisting of an emulsion-type acrylic resin, emulsified asphalt, and SBR latex to form a second sure, said crushed waste glass and fine rubble having particle pass rates in weight % of 80–100% measured by a 3-mm sieve, and less than 10% by a 1-mm sieve,
  - spreading the second mixture on the base layer within on hour of after said step of paving the base layer, and
  - pounding the second mixture to form the surface layer;
- aging the surface layer; and
- filling small pores of the surface layer.

2. The paving method of water-permeable concrete as defined in claim 1, wherein:
- an amount of said fine rubble used is determined to be within a range of 50–90% of an amount of said crude aggregate used; and
- an amount of said crushed waste glass used is determined to be within a range of 10–50% of an amount of said fine rubble used.

3. The paving method as defined in claim 1, wherein said step of filling small pores of the surface layer comprises
- mixing at least one polymer from a group consisting of an emulsion-type acrylic resin, an epoxy resin, urethane, emulsified asphalt, and latex with water to form a filling mixture;
- spreading the filling mixture on the surface layer; and
- aging the water-permeable concrete.

4. The paving method as defined in claim 1, wherein said step of paving the surface layer of water-permeable concrete further comprises the step of adding an inorganic pigment into the second mixture for coloring the surface layer.

5. The paving method of claim 4, wherein the inorganic pigment is less than 20% of the weight of cement used in the second mixture.

* * * * *